(12) United States Patent
Sennett et al.

(10) Patent No.: US 8,682,280 B1
(45) Date of Patent: Mar. 25, 2014

(54) SELECTABLE PROCESSING OF BROADCAST EAS MESSAGES

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1079 days.

(21) Appl. No.: 11/609,587

(22) Filed: Dec. 12, 2006

Related U.S. Application Data

(60) Provisional application No. 60/829,798, filed on Oct. 17, 2006.

(51) Int. Cl.
*H04M 11/04* (2006.01)

(52) U.S. Cl.
USPC .................. 455/404.1; 455/228; 455/414

(58) Field of Classification Search
None
See application file for complete search history.

(56) References Cited

U.S. PATENT DOCUMENTS

| | | | |
|---|---|---|---|
| 2001/0055963 A1* | 12/2001 | Cloutier ..................... | 455/417 |
| 2004/0044494 A1* | 3/2004 | Muller et al. ................ | 702/123 |
| 2004/0203562 A1* | 10/2004 | Kolsrud ...................... | 455/404.1 |
| 2005/0037728 A1* | 2/2005 | Binzel et al. ................. | 455/404.1 |
| 2006/0048180 A1* | 3/2006 | Kendall et al. ................ | 725/33 |
| 2007/0207771 A1* | 9/2007 | Bowser et al. ............. | 455/404.1 |
| 2009/0180596 A1* | 7/2009 | Reynolds et al. ............. | 379/48 |

OTHER PUBLICATIONS

U.S. Appl. No. 11/532,323, filed Sep. 15, 2006, Sennett.

* cited by examiner

*Primary Examiner* — Nimesh Patel
*Assistant Examiner* — Daniel Nobile
(74) *Attorney, Agent, or Firm* — Baker & Hostetler LLP

(57) ABSTRACT

Broadcast emergency alert messages are selectively processed in accordance with various aspects of the alerted event, the alert message, and/or user preferences. In an example configuration, a mobile device is preconfigured with instructions defining how to process various types of emergency alert messages. A received broadcast emergency alert message is analyzed to determine various characteristics pertaining to the message, such as alert type, alert subtype, likelihood of alert occurrence, alert severity, receipt time, geographic extent of the alert area, originator of the alert message, a time when the alert message was originated. The message is processed in accordance with the preconfigured instructions and the characteristics pertaining to the message. A user of the mobile device can tailor the type of EAS alerts to be received, the time period, or periods, during which EAS alerts can be received, and actions to be taken with respect to received alerts.

16 Claims, 10 Drawing Sheets

SELECTABLE PROCESSING OF BROADCAST EAS MESSAGES

CROSS REFERENCE TO RELATED APPLICATIONS

The present application claims priority to U.S. Provisional Patent Application No. 60/829,798 entitled "METHOD AND SYSTEM FOR USER TO SELECT BROADCAST EAS MESSAGES," filed Oct. 17, 2006, which is hereby incorporated by reference in its entirety.

TECHNICAL FIELD

The technical field generally relates to communications systems and more specifically relates to the broadcast of Emergency Alert System (EAS) notifications and messages. Even more specifically, the technical field relates to selective processing of EAS messages.

BACKGROUND

The Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. All subscribers, however, may not wish to receive alerts pertaining to all type of alerts. For example, a subscriber may wish to receive, or not receive, all types of alerts during specific time periods, such as receive alerts during the day, and not receive alerts between 10 PM and 8 AM. As another example, a subscriber may wish to receive particular types of alerts during specific time periods, such as receive alerts for weather events (e.g., tornadoes) at any time, and receive AMBER alerts only between 8 AM and 10 PM. As yet another example, a subscriber may wish to receive all alerts issued by the President of the United States or any message issued by a government agency (e.g., State Governor) at any time, but receive alerts about weather or geological events (e.g., earthquakes) only between the hours of 8 AM and 10 PM. Further, the subscriber may wish to be notified of the weather event only if the weather event is classified as having a severity of moderate or higher, otherwise save the indication of the weather event for subsequent review by the subscriber.

SUMMARY

A subscriber is provided the capability to tailor the type of EAS alerts to be received, the time period, or periods, during which EAS alerts can be received, and actions to be taken with respect to received alerts. The subscriber can select any combination of type, time, and/or action. In an example embodiment, an enhanced emergency alert message contains parameters indicative of the type of alert. The parameters are used to allow the subscriber to configure the reception of the alert tailored to the subscriber's preferences.

BRIEF DESCRIPTION OF THE DRAWINGS

The foregoing and other objects, aspects and advantages of selectable processing of broadcast EAS messages will be better understood from the following detailed description with reference to the drawings.

DETAILED DESCRIPTION OF ILLUSTRATIVE EMBODIMENTS

Subscribers of the Emergency Alert System (EAS) can receive messages pertaining to a variety of alerts. EAS messages are transmittable via broadcast technologies, such as, for example, Cell Broadcast, Multimedia Broadcast/Multicast Service ("MBMS"), and video broadcast, (e.g., Digital Video broadcast-Handheld ("DVB-H"), and MediaFLO), WiFi, WiMAX, NOAA (National Oceanic And Atmospheric Administration) Weather Radio, FM/AM radio, television, SMR (specialized mobile radio), satellite radio, satellite telephone service, and LMR (land mobile radio), or a combination thereof. In an example embodiment, an EAS message, referred to as an enhanced EAS message, comprises a parameter, or parameters, indicative of the type of alert, such as for example, weather, AMBER, government issued, geophysical e.g., landslide, meteorological, e.g., flood, general emergency and public safety, law enforcement, military, homeland and local/private security, rescue and recovery, fire suppression and rescue, medical and public health, pollution and other environmental conditions, public and private transportation, utility, telecommunication, other non-transport infrastructure, CBRNE (Chemical, Biological, Radiological, Nuclear or Explosive) threat or attack, and/or system test, or other type of alert. The parameters are utilized to allow tailored manipulation of the received broadcast enhanced EAS message. In one embodiment, the parameters are in a header of the enhanced EAS message. Upon receipt, by a mobile device or the like, the header is analyzed to determine the type of alert, and the message is handled in accordance with the type of alert and instructions provided to the mobile device. A subscriber is able to select which emergency alert messages to render based upon various characteristics of the message and upon time intervals. A subscriber can indicate which types of alerts are to be ignored, which types of alerts are to be saved for subsequent review, and which alerts are to be rendered (e.g., visual, audio, mechanical) via the mobile device. For example, a subscriber can chose to have an emergency alert message not render an audio alert tone, and be retained for subsequent review.

Figure 1:
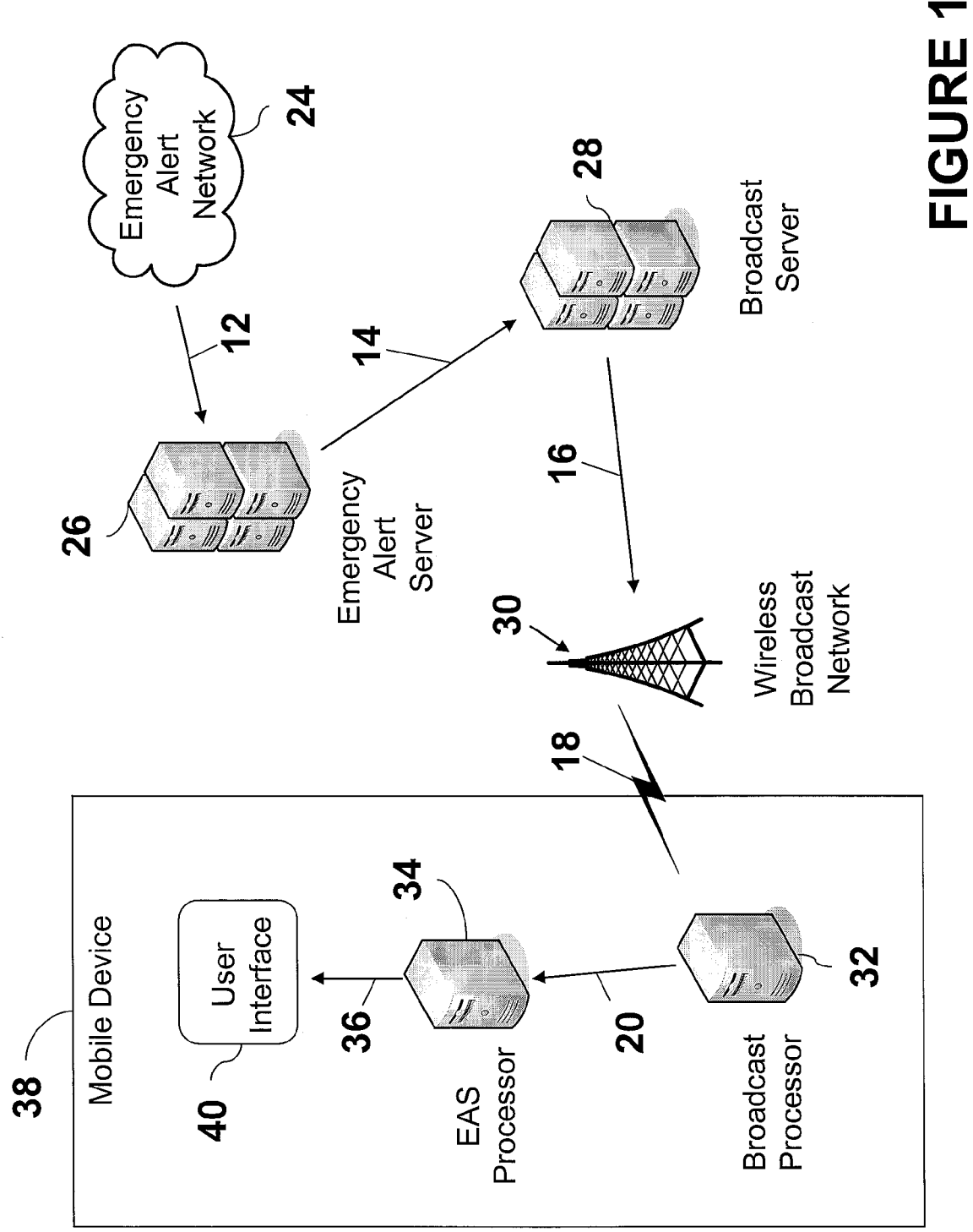
FIG. 1 is a flow diagram of an example process and system for selectable processing of a broadcast EAS messages.

FIG. 1 is a flow diagram of an example process and system for selectable processing of a broadcast EAS messages. At step 12, the emergency alert network 24 provides to the emergency alert server 26 an emergency alert message. In an example embodiment, the emergency alert network 24 provides a signal indicative of the alert message and the geographic alert area, or areas, in which the alert is to be broadcast. An alert area can be determined in any appropriate manner. In example embodiments, the indication of alert area provided by the emergency alert network 24 comprises a statically defined alert area, a dynamically defined alert area, or a combination thereof. A statically defined alert area can be specified in the alert message, utilizing for example, geographic code references such as the Federal Information Processing Standard (FIPS), ZIP codes, and/or the National Weather Service Specific Area Message Encoder (SAME) codes. A dynamically defined alert area can be specified in the alert message, utilizing for example, geometric shapes, such as polygons, formatted in accordance with a World Geodetic System 1984 (WGS-84) format, or the like. In an example embodiment, alert areas are defined statically and/or dynamically as described in U.S. patent application Ser. No. 11/532, 323, entitled "Determination Of EAS Delivery," filed Sep. 15, 2006, which is hereby incorporated by reference in its entirety.

The emergency alert server 26 evaluates the received emergency alert message and accordingly generates an enhanced emergency alert message. The enhanced emergency alert message, described in more detail below, comprises at least one parameter indicative of a characteristic, or characteristics, of the emergency alert and/or emergency alert message. Characteristics can include, for example, a type of alert, a subtype of an alert, a likelihood of alert occurrence (likelihood that the alerted event will occur), a severity of an alert, a time frame (or time of day) within which the alerted event is expected to occur (or has occurred), a geographic extent of the alert area, an originator of the alert message, a time when the alert message was originated, or a combination thereof. As also described in more detail below, the parameters can be used to determine how emergency alert messages are processed. The emergency alert server 26 determines a list of cellular sites associated with (cellular cites capable of providing coverage to the designated alert areas) the designated alert areas to which the enhanced emergency alert message is to be broadcast. In an example embodiment, the emergency alert server 26 determines the list of cellular cites based upon the dynamically and/or statically defined alert area(s) as indicated in the emergency alert message received from the emergency alert network 24.

At step 14, the emergency alert server 26 provides to a broadcast server 28 the enhanced emergency alert message and the list of cellular cites associated with the designated alert areas to which the enhanced emergency alert message is to be broadcast. The broadcast server 28, at step 16, provides to the wireless broadcast network 30 the enhanced emergency alert message, the list of cellular cites associated with the designated alert areas, and instructions to broadcast the enhanced emergency alert message to the designated alert areas via the list of cellular cites.

The wireless broadcast network 30 broadcasts the enhanced alert message at step 18. The wireless broadcast network 30 can utilize any appropriate broadcast technology to broadcast the enhanced emergency alert message. Appropriate broadcast technologies include, for example, Cell Broadcast, Multimedia Broadcast/Multicast Service ("MBMS"), and video broadcast, (e.g., Digital Video broadcast-Handheld ("DVB-H"), and MediaFLO), WiFi, WiMAX, NOAA (National Oceanic And Atmospheric Administration) Weather Radio, FM/AM radio, television, SMR (specialized mobile radio), satellite radio, satellite telephone service, and LMR (land mobile radio), or a combination thereof.

The broadcast processor 32 of the mobile device 38 receives (at step 18) the broadcast enhanced emergency alert message. Upon receipt of the broadcast enhanced emergency alert message, the broadcast processor 32 determines if the received message is an enhanced emergency alert message. If it is determined that the received message is not an enhanced emergency alert message, the received message is processed by the mobile device 38 as an EAS message. If it is determined that the received message is an enhanced emergency alert message, the parameters of the received enhanced emergency alert message are extracted and utilized to selectively process the received enhanced emergency alert message.

The broadcast processor 32 provides to the EAS processor 34 of the mobile device 38, at step 20, the enhanced emergency alert message. The EAS processor 34 extracts the parameters from the enhanced emergency alert message. The EAS processor 34 can extract the parameters at any appropriate time, such as upon receipt of the enhanced emergency alert message and/or subsequent to storage of the enhanced emergency alert message. The EAS processor 34 contains therein, preferences, or instructions, previously provided, by the subscriber, for example. The EAS processor 34, upon extracting the parameters from the enhanced alert message, processes the emergency alert message in accordance with the predetermined instructions, or rules, and the extracted parameters. In an example embodiment, processing of the emergency alert message results in: (1) rendering a notification of the alert and rendering the alert message, (2) storing the emergency message and not rendering a notification of the alert, or (3) ignoring the emergency alert message.

If the processing of the emergency alert message results in a notification of the alert and/or the emergency alert message to be rendered, the notification of the alert and/or the emergency alert message to be rendered, is provided, at step 36, to a user interface 40 of the mobile device 38. Rendering a notification of an alert can be accomplished in appropriate manner, such as an audible alert via a transducer of the mobile device 38, a visual alert on a display of the mobile device 38, and/or a mechanical (e.g., vibration) alert via the mobile device 38. Rendering an alert message can be accomplished in appropriate manner, such as an audible alert message via a transducer of the mobile device 38 and/or a visual alert message on a display of the mobile device 38.

In an example embodiment, parameters indicative of characteristics of the emergency alert message are embedded in an EAS message header of the enhanced emergency alert message by the emergency alert server 26. The EAS message header is evaluated by the broadcast processor 32 upon receipt of the enhanced emergency alert message (at step 18) to determine if the received message is an enhanced emergency alert message and the EAS processor 34 extracts the parameters from the EAS message header.

The parameters of the enhanced emergency alert message can be indicative of any appropriate characteristic(s) of the emergency alert and/or the emergency alert message. For example, characteristics can include, a type of alert, a subtype of an alert, a likelihood of alert occurrence (likelihood that the alerted event will occur), a severity of an alert, a time frame (or time of day) within which the alerted event is expected to occur (or has occurred), a geographic extent of the alert area, an originator of the alert message, a time when the alert message was originated, or a combination thereof. Example alert message types include geophysical (e.g., landslide), meteorological (e.g., weather, flood), public safety, child abduction (e.g. AMBER), public health, CBRNE (Chemical, Biological, Radiological, Nuclear, Explosive), system test, government issued, general emergency, law enforcement, military, homeland and local/private security, rescue and recovery, fire suppression and rescue, medical and public health, pollution and other environmental conditions, public and private transportation, utility, telecommunication, other non-transport infrastructure, and/or any other type of alert. Example alert message subtypes for the alert message type of meteorological include windstorm, tornado, hurricane, tsunami, lightning storms, thunderstorms, hurricanes, freezing rain, blizzards, fog, or the like. Example likelihood of occurrence characteristics include weather related increased likelihood of occurrence as warnings, watches, and alerts. Example severity of alert characteristics include attributes such as minor, moderate, major, and extreme. Example geographic extent characteristic include zip code, city, county, state, and national. It is emphasized that the above example characteristics are exemplary and are not limited thereto.

As described above, the enhanced emergency message can comprise a plurality of parameters (e.g., in the EAS message header). The mobile device 38 can be configured to process an emergency alert message in accordance with one or more parameters of the enhanced emergency alert message. The mobile device 38 can be configured in any appropriate manner, such as by programming instructions, or rules, into memory (e.g., memory in the EAS processor 34, memory of the mobile device 38 not in the EAS processor 34, or combination thereof), by a subscriber to the EAS and/or a provider of the mobile device 38. In an example embodiment, the mobile device 38 can be configured to process parameters independently to ignore, save, or render the alert message. If the instructions for each of a plurality of evaluated parameters indicate that the emergency alert message is to be rendered, the emergency alert message is rendered. If the instructions for each of a plurality of evaluated parameters indicate that the notification of the emergency alert is to be rendered, the notification of the emergency alert is rendered. If the instructions for any one of a plurality of evaluated parameters indicate the emergency alert message is to be ignored, the emergency alert message is ignored. That is, the emergency alert message is not rendered, a notification of the emergency alert is not rendered, and the emergency alert message is not stored in memory. If the instructions for any one of a plurality of evaluated parameters indicate the emergency alert message is to be saved, and none of the instructions for the plurality of evaluated parameters indicate that the emergency alert message is to be ignored, the emergency alert message is saved (e.g., in memory of the EAS processor 34, in memory of the mobile device 38 not in the EAS processor 34, or a combination thereof) and not notification of the emergency alert is rendered.

Figure 2:
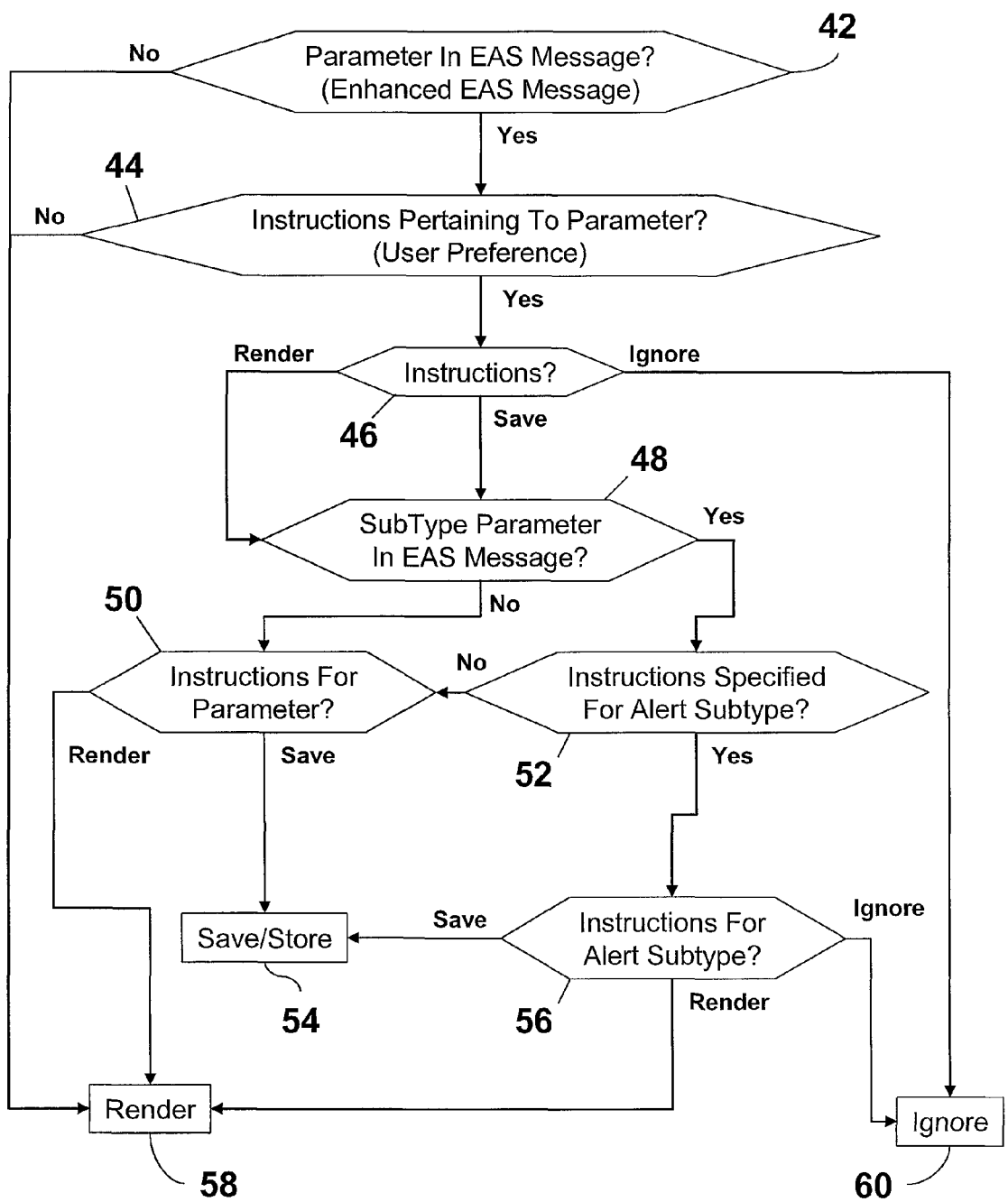
FIG. 2 is a flow diagram of an example process for selectively processing a broadcast message.

FIG. 2 is a flow diagram of an example process for selectively processing a broadcast message. At step 42, upon receipt of the broadcast message (e.g., received by the broadcast processor 32 of the mobile device 38), the received message is analyzed to determine if the message comprises a parameter indicative of a characteristic of the emergency alert. If no parameter is found, the emergency alert message and/or a notification of the emergency alert is rendered at step 58. As described above, the emergency alert message and/or the notification of an alert can be accomplished in appropriate manner, such as an audible alert (e.g., via a transducer of the mobile device 38), a visual alert (e.g., on a display of the mobile device 38), and/or a mechanical (e.g., vibration) alert (e.g., via the mobile device 38).

If the received broadcast emergency alert message comprises at least one parameter, it is determined if the predetermined instructions define how to process the emergency alert message that has the parameter(s) (i.e., the enhanced emergency alert message). If the predetermined instructions define how to process the enhanced emergency alert message, the enhanced emergency alert message is processed in accordance with the predetermined instructions. If the predetermined instructions do not define how to process the emergency alert message, the emergency alert message is rendered. If (at step 42) a parameter is found (indicating that the received message is an enhanced emergency alert message), it is determined, at step 44, if instructions pertaining to the parameter are specified. Instruction can be indicative of a user (or subscriber) preference, a preset downloaded by a supplier, or the like, of a mobile device, or a combination thereof. In an example embodiment, the EAS processor 34 of the mobile device 38, searches for instructions pertaining to the parameter. If no instructions are found (at step 44), the emergency alert message and/or a notification of the emergency alert is rendered at step 58. If instructions are found (at step 44), the specific instruction pertaining to the parameter is determined at step 46. If the instruction is ignore, the emergency alert message is ignored at step 60. As described above, if the emergency alert message is ignored, the emergency alert message is not rendered, a notification of the emergency alert is not rendered, and the emergency alert message is not stored in memory. If the instruction is render or save/store, it is determined at step 48 if the enhanced emergency alert message comprises a subtype parameter. In an example embodiment, as described above, the EAS header of the enhanced emergency alert message is analyzed to find a subtype parameter.

If no subtype parameter is found (at step 48), the emergency alert message is processed in accordance with the instructions pertaining to the parameter. At step 50, the instructions pertaining to the parameter are determined, and the emergency alert message is accordingly rendered or saved/stored at step 58 or 54, respectively. As described above, saved messages are available for subsequent review. If (at step 52) a subtype parameter is found, the instructions pertaining to the subtype parameter are determined at step 56. The instructions pertaining to the subtype parameter can comprises save, render, or ignore. According, per step 56, the emergency alert message and/or the notification of the emergency alert is saved, rendered, or ignored at step 54, 58, or 60, respectively.

Figure 3:
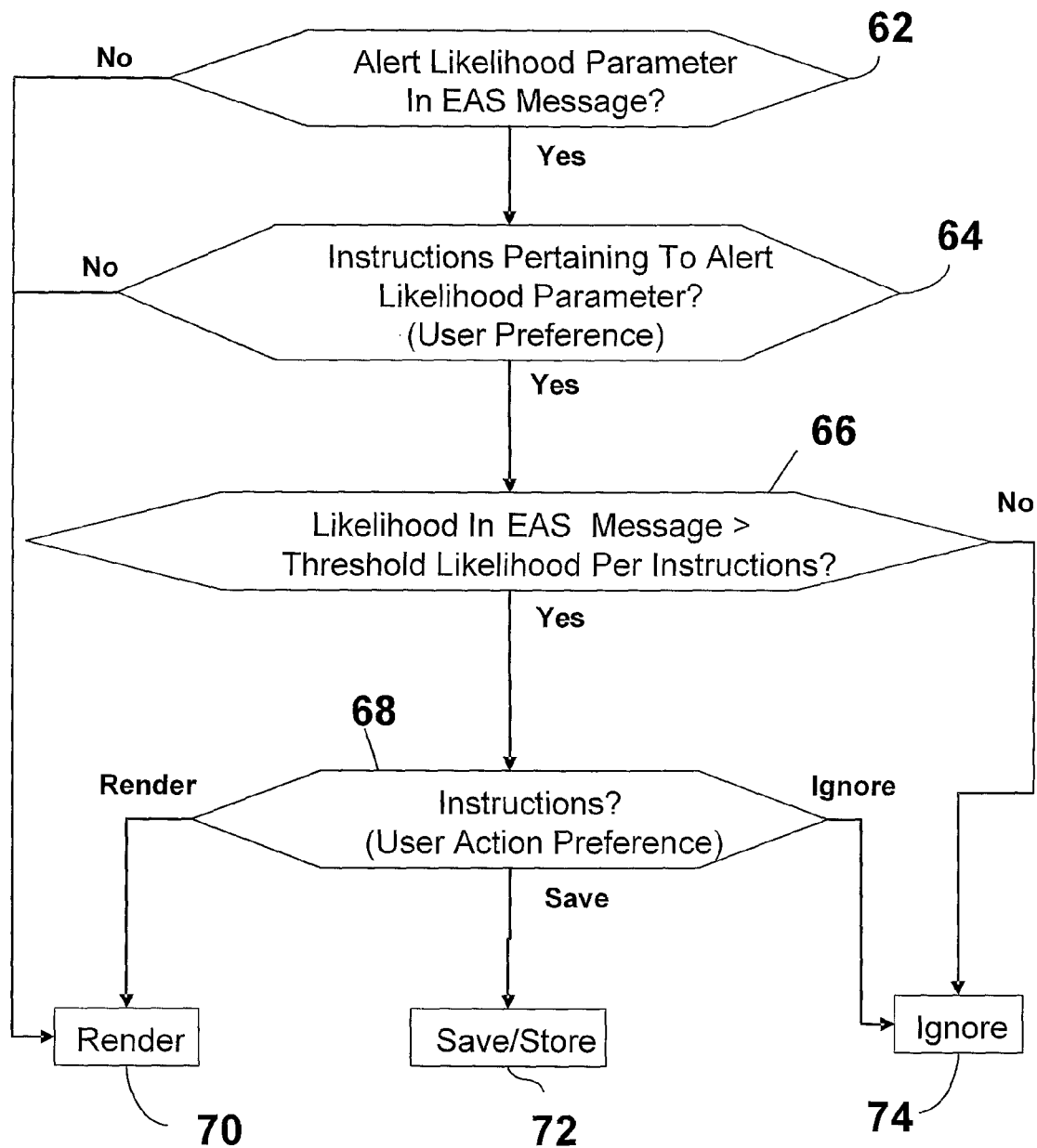
FIG. 3 is a flow diagram of an example process for processing an enhanced emergency alert message comprising a parameter pertaining to an alert likelihood.

FIG. 3 is a flow diagram of an example process for processing an enhanced emergency alert message comprising a parameter pertaining to an alert likelihood. As described above, a parameter can pertain to a characteristic of the emergency alert such as a likelihood that the alerted event will occur. For example, for weather related events, an alert likelihood can be designated as a warning, a watch, or an alert. An emergency event designated as an alert is more likely to occur than an emergency event designated as a watch. And, an emergency event designated as a watch is more likely to occur than an emergency event designated as a warning. At step 62, upon receipt of the broadcast message (e.g., received by the broadcast processor 32 of the mobile device 38), the received message is analyzed to determine if the message comprises a parameter indicative of an alert likelihood. If no parameter indicative of an alert likelihood is found, the emergency alert message and/or a notification of the emergency alert is rendered at step 70.

If (at step 62) a parameter indicative of an alert likelihood is found, it is determined, at step 64, if instructions pertaining to the parameter indicative of an alert likelihood are specified. In an example embodiment, the EAS processor 34 of the mobile device 38, searches for instructions pertaining to the parameter indicative of an alert likelihood. If no instructions pertaining to an alert likelihood are found (at step 64), the emergency alert message and/or a notification of the emergency alert is rendered at step 70. If instructions pertaining to an alert likelihood are found (at step 64), it is determined at step 66, if a threshold likelihood of occurrence, as specified in the instructions, is exceed by the likelihood of occurrence indicated by the parameter. For example, the instruction could indicate the threshold likelihood of occurrence as a watch. If the likelihood of occurrence as indicated by the parameter is a warning, the threshold is not exceeded, and if the likelihood of occurrence as indicated by the parameter is an alert, the threshold is exceeded.

If (at step 66) the likelihood of occurrence as indicated by the parameter does not exceed the threshold likelihood of occurrence as indicated by the parameter, the emergency alert message is ignored at step 74. If (at step 66) the likelihood of occurrence as indicated by the parameter exceeds the threshold likelihood of occurrence as indicated by the instructions, it is determined at step 68 what instructions are associated therewith. If the instructions (step 68) indicate that the emergency message is to be ignored when the likelihood of occurrence as indicated by the parameter exceeds the threshold likelihood of occurrence as indicated by the instructions, the emergency alert message is ignored at step 74. If the instructions (step 68) indicate that the emergency message is to be stored when the likelihood of occurrence as indicated by the parameter exceeds the threshold likelihood of occurrence as indicated by the instructions, the emergency alert message is stored at step 72. If the instructions (step 68) indicate that the emergency message is to be rendered when the likelihood of occurrence as indicated by the parameter exceeds the threshold likelihood of occurrence as indicated by the instructions, the emergency alert message and/or a notification of the emergency alert is rendered at step 74.

Figure 4:
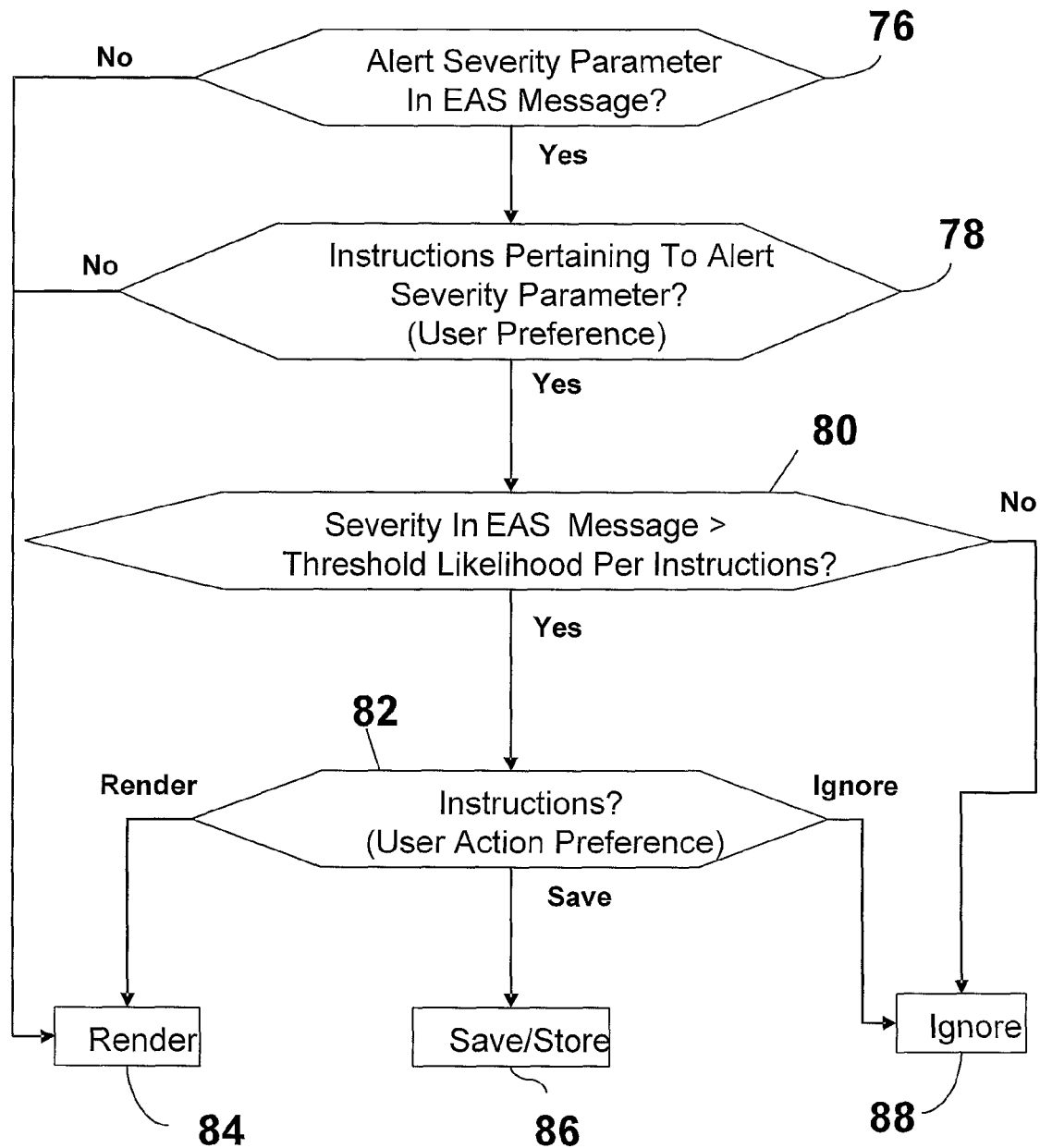
FIG. 4 is a flow diagram of an example process for processing an enhanced emergency alert message comprising a parameter pertaining to an alert severity.

FIG. 4 is a flow diagram of an example process for processing an enhanced emergency alert message comprising a parameter pertaining to an alert severity. As described above, a parameter can pertain to a characteristic indicative of the severity of an emergency event. For the severity of an event can be designated, in order of increasing severity, as minor, moderate, major, or extreme. At step 76, upon receipt of the broadcast message (e.g., received by the broadcast processor 32 of the mobile device 38), the received message is analyzed to determine if the message comprises a parameter indicative of an alert severity. If no parameter indicative of an alert severity is found, the emergency alert message and/or a notification of the emergency alert is rendered at step 84.

If (at step 76) a parameter indicative of an alert severity is found, it is determined, at step 78, if instructions pertaining to the parameter indicative of an alert severity are specified. In an example embodiment, the EAS processor 34 of the mobile device 38, searches for instructions pertaining to the parameter indicative of an alert severity. If no instructions pertaining to an alert severity are found (at step 78), the emergency alert message and/or a notification of the emergency alert is rendered at step 84. If instructions pertaining to an alert severity are found (at step 78), it is determined at step 80, if a threshold severity, as specified in the instructions, is exceed by the severity indicated by the parameter. For example, the instruction could indicate the threshold severity moderate. If the severity as indicated by the parameter is a minor, the threshold is not exceeded, and if the severity as indicated by the parameter is major or extreme, the threshold is exceeded.

If (at step 80) the severity as indicated by the parameter does not exceed the threshold severity as indicated by the parameter, the emergency alert message is ignored at step 88. If (at step 80) the severity as indicated by the parameter exceeds the threshold severity as indicated by the instructions, it is determined at step 82 what instructions are associated therewith. If the instructions (step 82) indicate that the emergency message is to be ignored when the severity as indicated by the parameter exceeds the threshold severity as indicated by the instructions, the emergency alert message is ignored at step 88. If the instructions (step 82) indicate that the emergency message is to be saved/stored when the severity as indicated by the parameter exceeds the threshold severity as indicated by the instructions, the emergency alert message is stored at step 86. If the instructions (step 82) indicate that the emergency message is to be rendered when the severity as indicated by the parameter exceeds the threshold severity as indicated by the instructions, the emergency alert message and/or a notification of the emergency alert is rendered at step 84.

Figure 5:
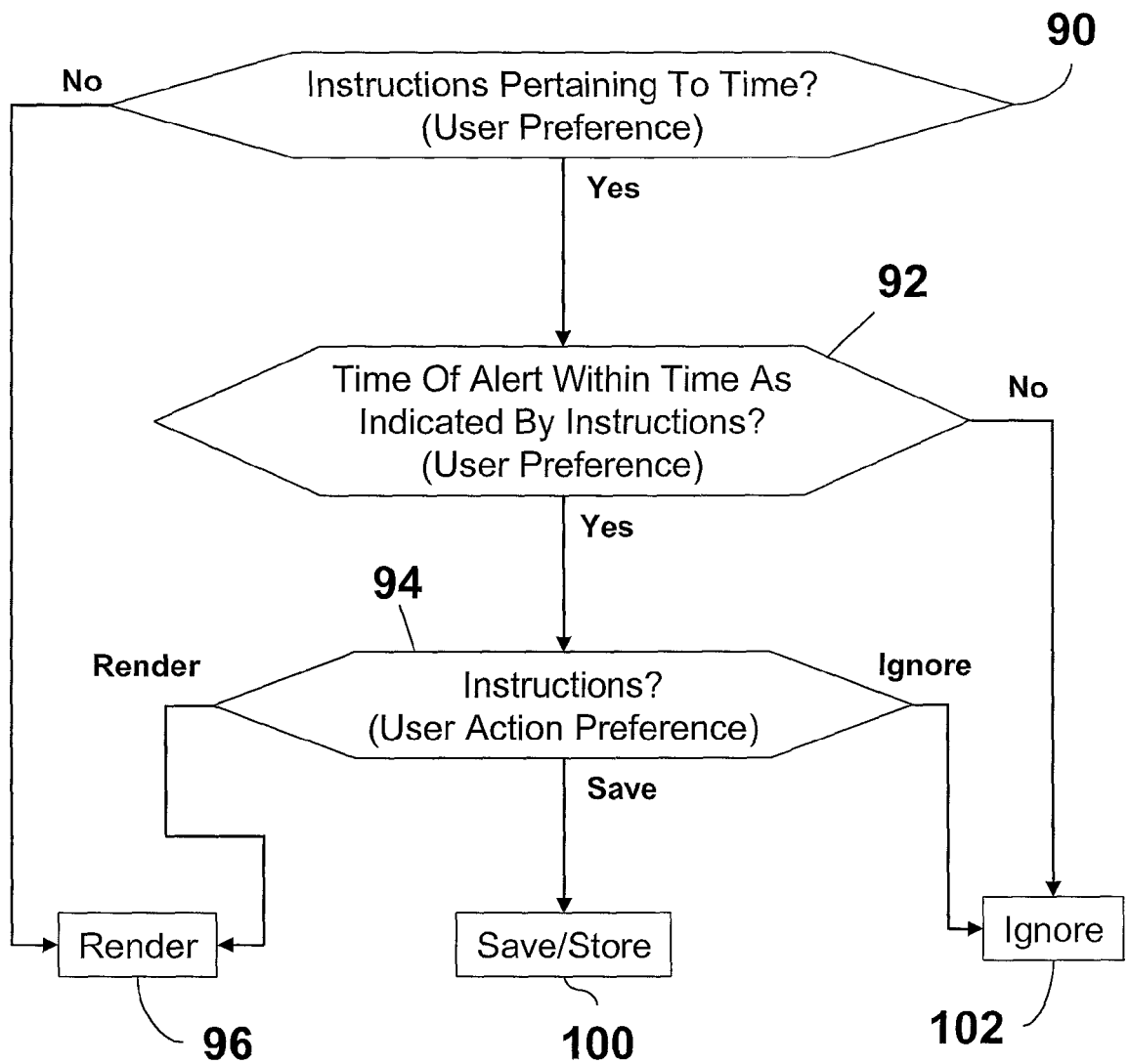
FIG. 5 is a flow diagram of an example process for processing an enhanced emergency alert message in accordance with the time the message is received.

FIG. 5 is a flow diagram of an example process for processing an enhanced emergency alert message in accordance with the time the message is received. As described above, a received message can be selectively processed in accordance with the time, such as time of day, it is received (e.g., by the mobile device 38). At step 90, upon receipt of the broadcast message (e.g., received by the broadcast processor 32 of the mobile device 38), it is determined if instructions pertaining to the time the emergency alert message is received are specified. In an example embodiment, the EAS processor 34 of the mobile device 38, searches for instructions pertaining to the time the emergency alert message is received. If no instructions pertaining to the time the emergency alert message is received are found (at step 90), the emergency alert message and/or a notification of the emergency alert is rendered at step 96. If instructions pertaining to the time the emergency alert message is received are found (at step 90), it is determined at step 92, if the time the emergency alert message is received is within a time frame as specified in the instructions.

It is to be understood that the time frame as specific in the instructions can be the time before or after a threshold value of time. For example, if the instructions indicate that an emergency alert message is to be processed if received after 6:00 AM, the time frame is any time after 6:00 AM. Similarly, if the instructions indicate that emergency alert message is to be processed if received before 11:00 PM, the time frame is any time before 11:00 PM. The time frame can also include a start time and an end time. For example, if the instructions indicate that emergency alert message is to be processed if received between after 6:00 AM and 11:00 PM, the time frame is the time period between 6:00 AM and 11:00 PM. Further, a time frame having a start time and an end time can be inclusively defined, exclusively defined, a combination thereof. For example, a time frame can be between 6:00 AM and 11:00 PM, wherein the time frame includes 6:00 AM (inclusively defined) and excludes 11:00 PM (exclusively defined).

If (at step 92) the time the emergency alert message is received is not within a time frame as specified in the instructions, the emergency alert message is ignored at step 102. If (at step 92) the time the emergency alert message is received is within a time frame as specified in the instructions, it is determined at step 94 what instructions are associated therewith. If the instructions (step 94) indicate that the emergency message is to be ignored when the time the emergency alert message is received is within a time frame as specified in the instructions, the emergency alert message is ignored at step 102. If the instructions (step 94) indicate that the emergency message is to be saved/stored when the time the emergency alert message is received is within a time frame as specified in the instructions, the emergency alert message is stored at step 100. If the instructions (step 92) indicate that the emergency message is to be rendered when the time the emergency alert message is received is within a time frame as specified in the instructions, the emergency alert message and/or a notification of the emergency alert is rendered at step 96.

Figure 6:
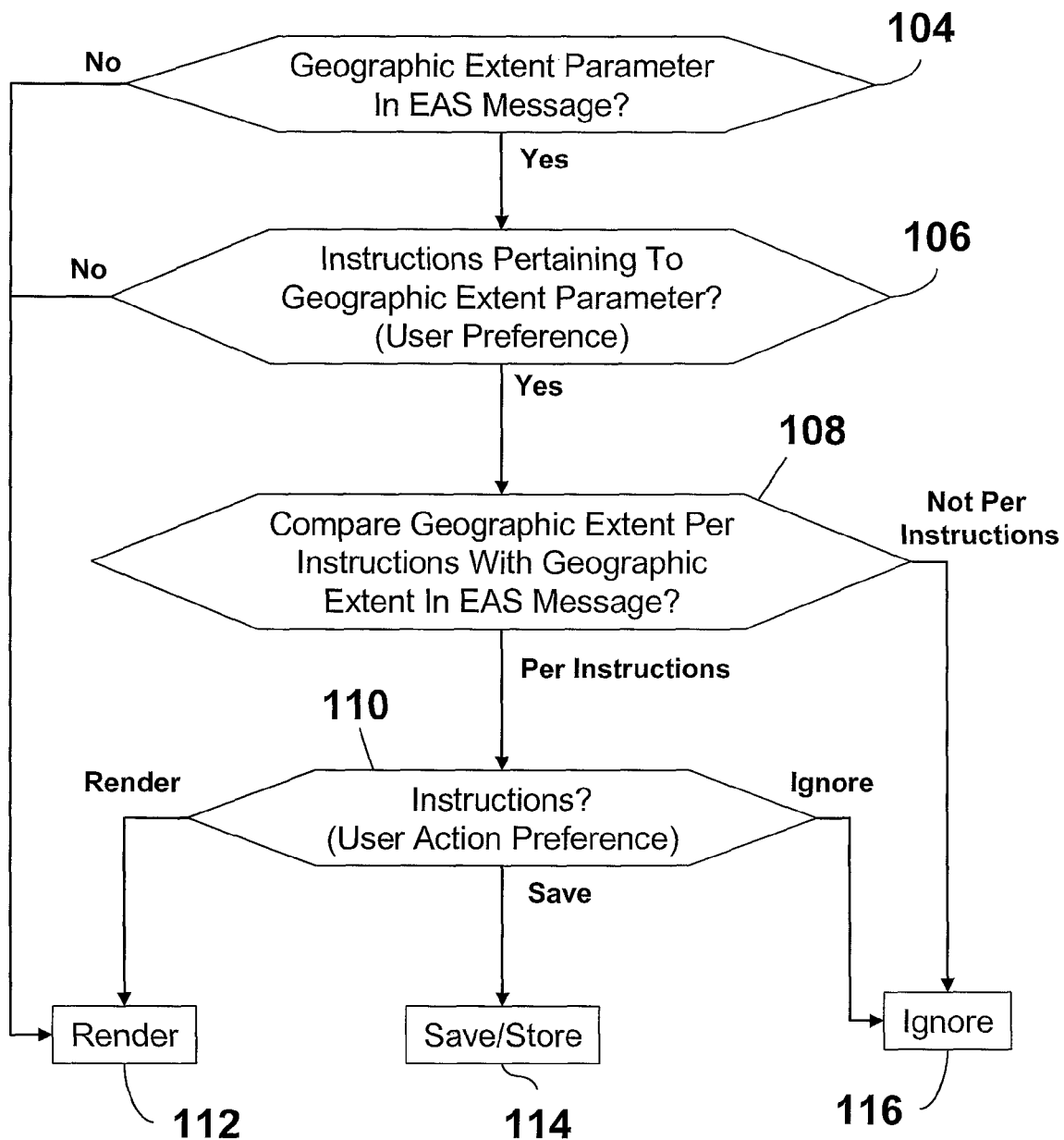
FIG. 6 is a flow diagram of an example process for processing an enhanced emergency alert message comprising a parameter indicative of a geographic extent of the alert.

FIG. 6 is a flow diagram of an example process for processing an enhanced emergency alert message comprising a parameter indicative of a geographic extent of the alert. As described above, a parameter can pertain to a characteristic indicative of the geographic extent of the emergency event. For example, geographic extent characteristics can include zip code, city, county, state, and/or nation. The instructions pertaining to geographic extent of the alert could additionally be based upon an associated distance, such as an alert within 10 miles of a current GPS location, or an alert within 5 miles of a ZIP code, or the like, for example. At step 104, upon receipt of the broadcast message (e.g., received by the broadcast processor 32 of the mobile device 38), the received message is analyzed to determine if the message comprises a parameter indicative of geographic extent of the alert. If no parameter indicative of the geographic extent of the alert is found, the emergency alert message and/or a notification of the emergency alert is rendered at step 112.

If (at step 104) a parameter indicative of the geographic extent of the alert is found, it is determined, at step 106, if instructions pertaining to the parameter indicative of the geographic extent of the alert are specified. In an example embodiment, the EAS processor 34 of the mobile device 38, searches for instructions pertaining to the geographic extent of the alert. If no instructions pertaining to the geographic extent of the alert are found (at step 106), the emergency alert message and/or a notification of the emergency alert is rendered at step 112. If instructions pertaining to the geographic extent of the alert are found (at step 106), the geographic extent as defined in the instructions is compared to the geographic extent as indicated by the parameter at step 108. If (at step 108) the geographic extent as indicated by the parameter is not in accordance with the geographic extent as defined in the instructions, the emergency alert message is ignored at step 116. If (at step 108) the geographic extent as indicated by the parameter is in accordance with the geographic extent as defined in the instructions, it is determined at step 110 what instructions are associated therewith. If the instructions (step 110) indicate that the emergency message is to be ignored when the geographic extent as indicated by the parameter is in accordance with the geographic extent as defined in the instructions, the emergency alert message is ignored at step 116. If the instructions (step 110) indicate that the emergency message is to be saved/stored when the geographic extent as indicated by the parameter is in accordance with the geographic extent as defined in the instructions, the emergency alert message is stored at step 114. If the instructions (step 110) indicate that the emergency message is to be rendered when the geographic extent as indicated by the parameter is in accordance with the geographic extent as defined in the instructions, the emergency alert message and/or a notification of the emergency alert is rendered at step 112.

Figure 7:
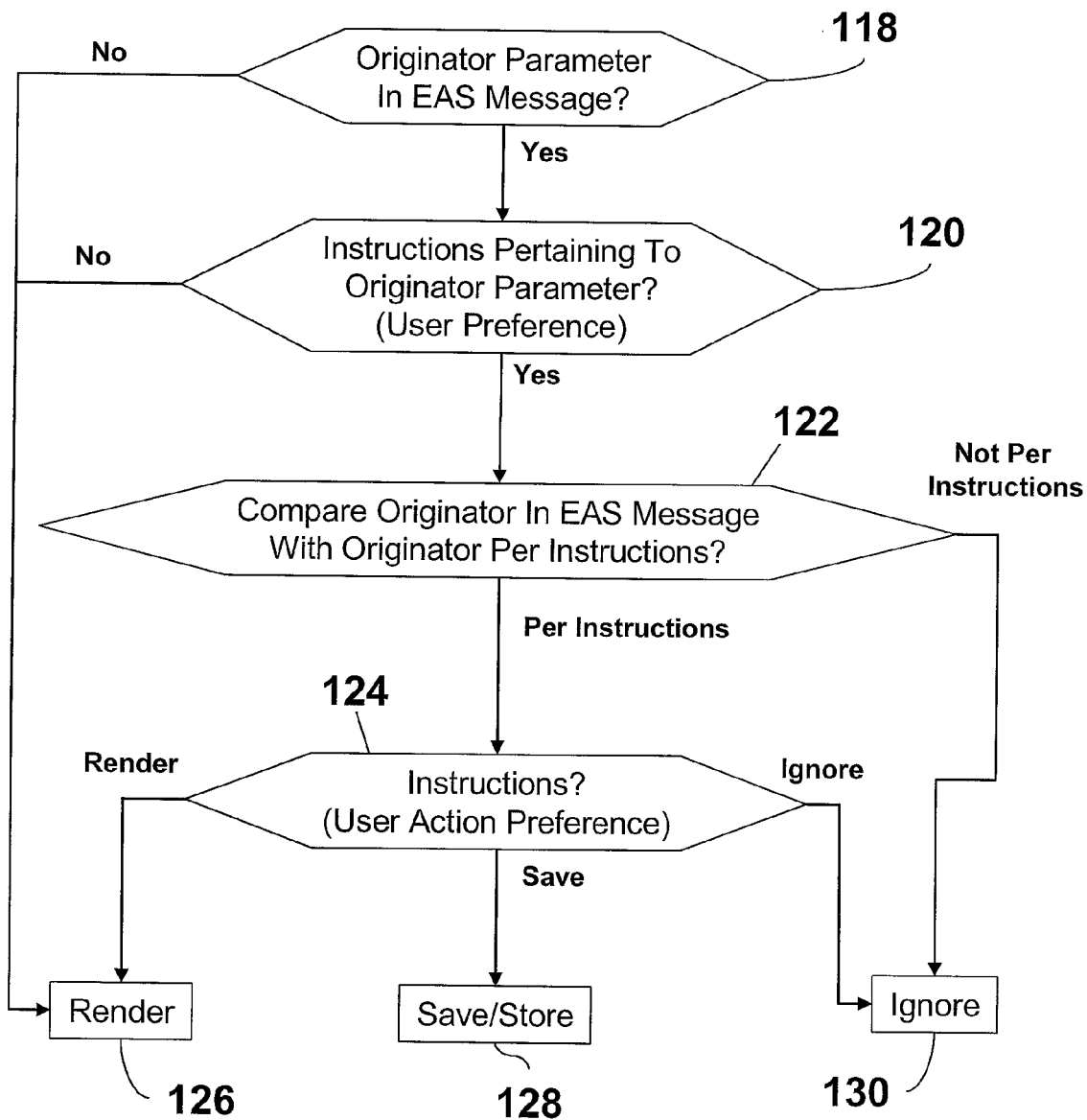
FIG. 7 is a flow diagram of an example process for processing an enhanced emergency alert message comprising a parameter indicative of an originator of the alert message.

FIG. 7 is a flow diagram of an example process for processing an enhanced emergency alert message comprising a parameter indicative of an originator of the alert message. As described above, a parameter can pertain to a characteristic indicative of the originator of the alert message. At step 118, upon receipt of the broadcast message (e.g., received by the broadcast processor 32 of the mobile device 38), the received message is analyzed to determine if the message comprises a parameter indicative of the originator of the alert message. If no parameter indicative of the geographic extent of the alert is found, the emergency alert message and/or a notification of the emergency alert is rendered at step 126.

If (at step 118) a parameter indicative of the originator of the alert is found, it is determined, at step 120, if instructions pertaining to the parameter indicative of the originator of the alert message are specified. In an example embodiment, the EAS processor 34 of the mobile device 38, searches for instructions pertaining to the originator of the alert message. Example instructions pertaining to originator include "only from state," "only from National Weather Service," "only from my current location," or the like. If no instructions pertaining to the originator of the alert message are found (at step 120), the emergency alert message and/or a notification of the emergency alert is rendered at step 126. If instructions pertaining to the originator of the alert message are found (at step 120), the originator of the alert message as defined in the instructions is compared to the originator of the alert message as indicated by the parameter at step 122. If (at step 122) the originator of the alert message as indicated by the parameter is not in accordance with the originator of the alert message as defined in the instructions, the emergency alert message is ignored at step 130. If (at step 122) the originator of the alert message as indicated by the parameter is in accordance with the originator of the alert message as defined in the instructions, it is determined at step 124 what instructions are associated therewith. If the instructions (step 124) indicate that the emergency message is to be ignored when the originator of the alert message as indicated by the parameter is in accordance with the originator of the alert message as defined in the instructions, the emergency alert message is ignored at step 130. If the instructions (step 124) indicate that the emergency message is to be saved/stored when the originator of the alert message as indicated by the parameter is in accordance with the originator of the alert message as defined in the instructions, the emergency alert message is stored at step 128. If the instructions (step 124) indicate that the emergency message is to be rendered when the originator of the alert message as indicated by the parameter is in accordance with the originator of the alert message as defined in the instructions, the emergency alert message and/or a notification of the emergency alert is rendered at step 126.

The mobile device 38 is representative of any appropriate type of device that can be utilized to receive a broadcast message. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

The mobile device 38 can comprise any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Each of the emergency alert server 26, the broadcast server 28 and the mobile device 38 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof.

The following description sets forth some exemplary telephony radio networks and non-limiting operating environments for broadcasting secure messages. The below-described operating environments should be considered non-exhaustive, however, and thus the below-described network architectures merely show how selectable processing of broadcast messages may be incorporated into existing network structures and architectures. It can be appreciated, however, that broadcasting secure messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1X Evolution Data Optimized ("EVDO"), Code Division Multiple Access-2000 ("cdma2000 3X"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of selectable processing of broadcast messages can be applied independently of the method for data transport, and do not depend on any particular network architecture, or underlying protocols.

Figure 8:
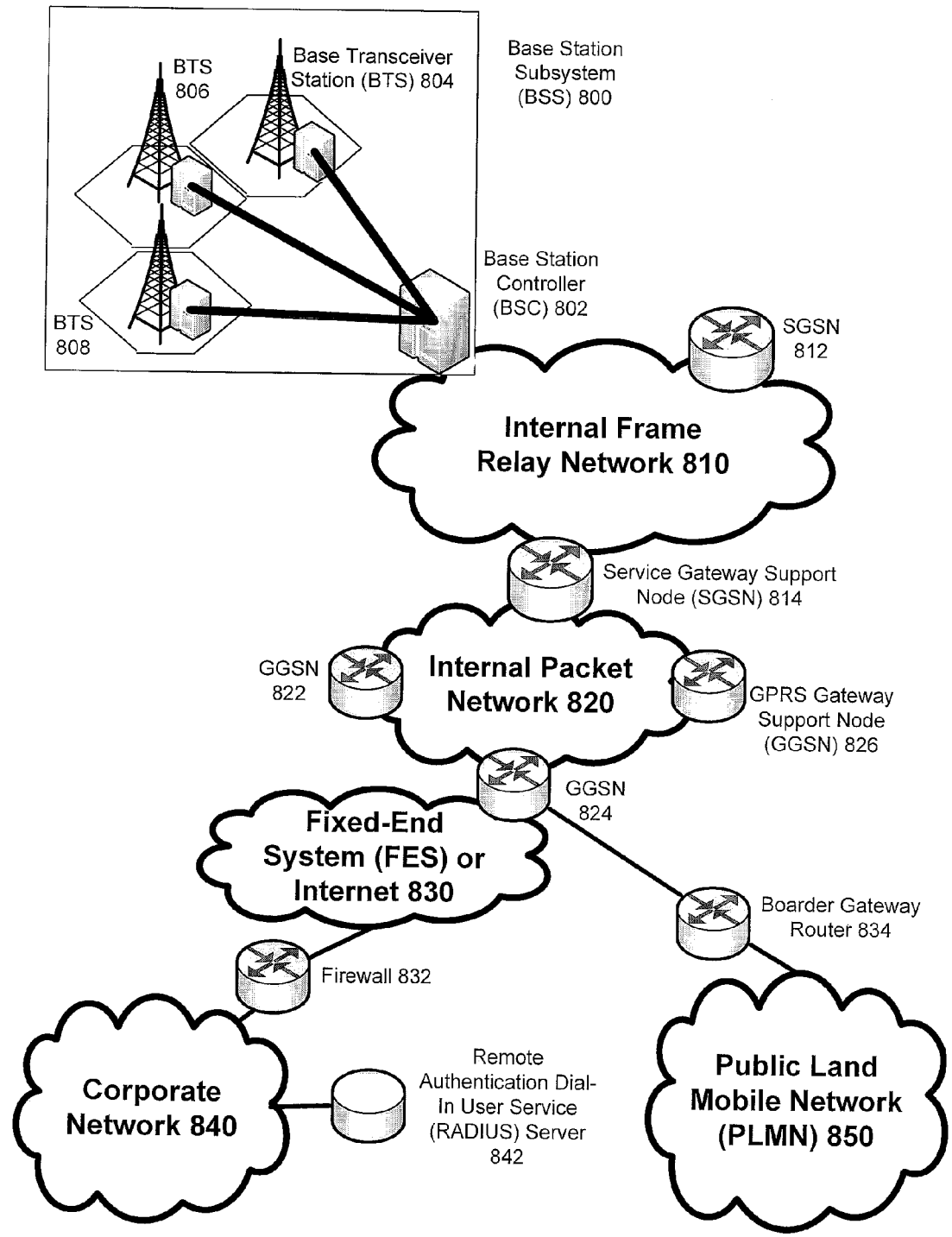
FIG. 8 depicts an overall block diagram of an exemplary packet-based mobile cellular network environment, such as a GPRS network, in which the system for selectively processing broadcast messages can be practiced.

FIG. 8 depicts an overall block diagram of an exemplary packet-based mobile cellular network environment, such as a GPRS network, in which the system for selectively processing broadcast messages can be practiced. In an example configuration, the emergency alert network 84 and/or the wireless broadcast network 30 are encompassed by the network environment depicted in FIG. 8. In such an environment, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices (e.g., portable device 38) become connected to the wireless network. In exemplary fashion, the packet traffic originating from user devices (e.g., user device 80) is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 9:
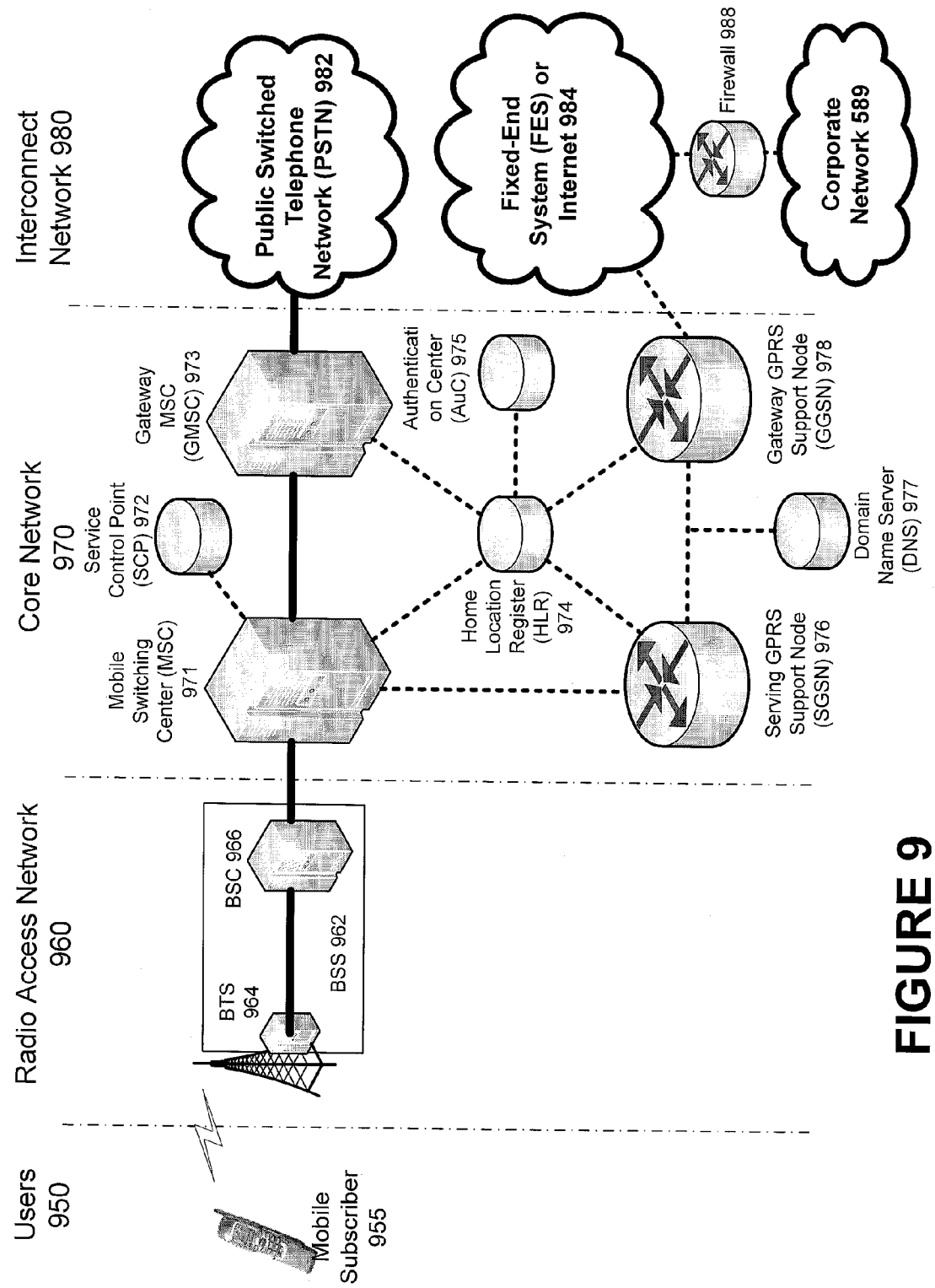
FIG. 9 illustrates an architecture of a typical GPRS network as segmented into four groups.

FIG. 9 illustrates an architecture of a typical GPRS network as segmented into four groups: users 950, radio access network 960, core network 970, and interconnect network 980. In an example configuration the emergency alert network 24, and the wireless broadcast network 30 are encompassed by the radio access network 960, core network 970, and interconnect network 980. Users 950 comprise a plurality of end users (though only mobile subscriber 955 is shown in FIG. 9). In an example embodiment, the device depicted as mobile subscriber 955 comprises portable device 38. Radio access network 960 comprises a plurality of base station subsystems such as BSSs 962, which include BTSs 964 and BSCs 966. Core network 970 comprises a host of various network elements. As illustrated here, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 9, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the portable device 38, used by an end user of the mobile cellular service. When a mobile subscriber turns on his or her mobile device, the mobile device goes through an attach process by which the mobile device attaches to an SGSN of the GPRS network. In FIG. 9, when mobile subscriber 955 initiates the attach process by turning on the network capabilities of the mobile device, an attach request is sent by mobile subscriber 955 to SGSN 976. The SGSN 976 queries another SGSN, to which mobile subscriber 955 was attached before, for the identity of mobile subscriber 955. Upon receiving the identity of mobile subscriber 955 from the other SGSN, SGSN 976 requests more information from mobile subscriber 955. This information is used to authenticate mobile subscriber 955 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 955 was attached before, to cancel the location process for mobile subscriber 955. HLR 974 then notifies SGSN 976 that the location update has been performed. At this time, SGSN 976 sends an Attach Accept message to mobile subscriber 955, which in turn sends an Attach Complete message to SGSN 976.

After attaching itself with the network, mobile subscriber 955 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 955. The mobile subscriber 955 uses an algorithm to send the user identification (ID) and password to SGSN 976. The SGSN 976 uses the same algorithm and compares the result. If a match occurs, SGSN 976 authenticates mobile subscriber 955.

Next, the mobile subscriber 955 establishes a user session with the destination network, corporate network 989, by going through a Packet Data Protocol ("PDP") activation process. Briefly, in the process, mobile subscriber 955 requests access to the Access Point Name ("APN"), for example, UPS.com (e.g., which can be corporate network 989 in FIG. 9) and SGSN 976 receives the activation request from mobile subscriber 955. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 955.

Once activated, data packets of the call made by mobile subscriber 955 can then go through radio access network 960, core network 970, and interconnect network 980, in a particular fixed-end system or Internet 984 and firewall 988, to reach corporate network 989.

Thus, network elements that can invoke the functionality of selectively processing and EAS message can include but are not limited to Gateway GPRS Support Node tables, Fixed End System router tables, firewall systems, VPN tunnels, and any number of other network elements as required by the particular digital network.

Figure 10:
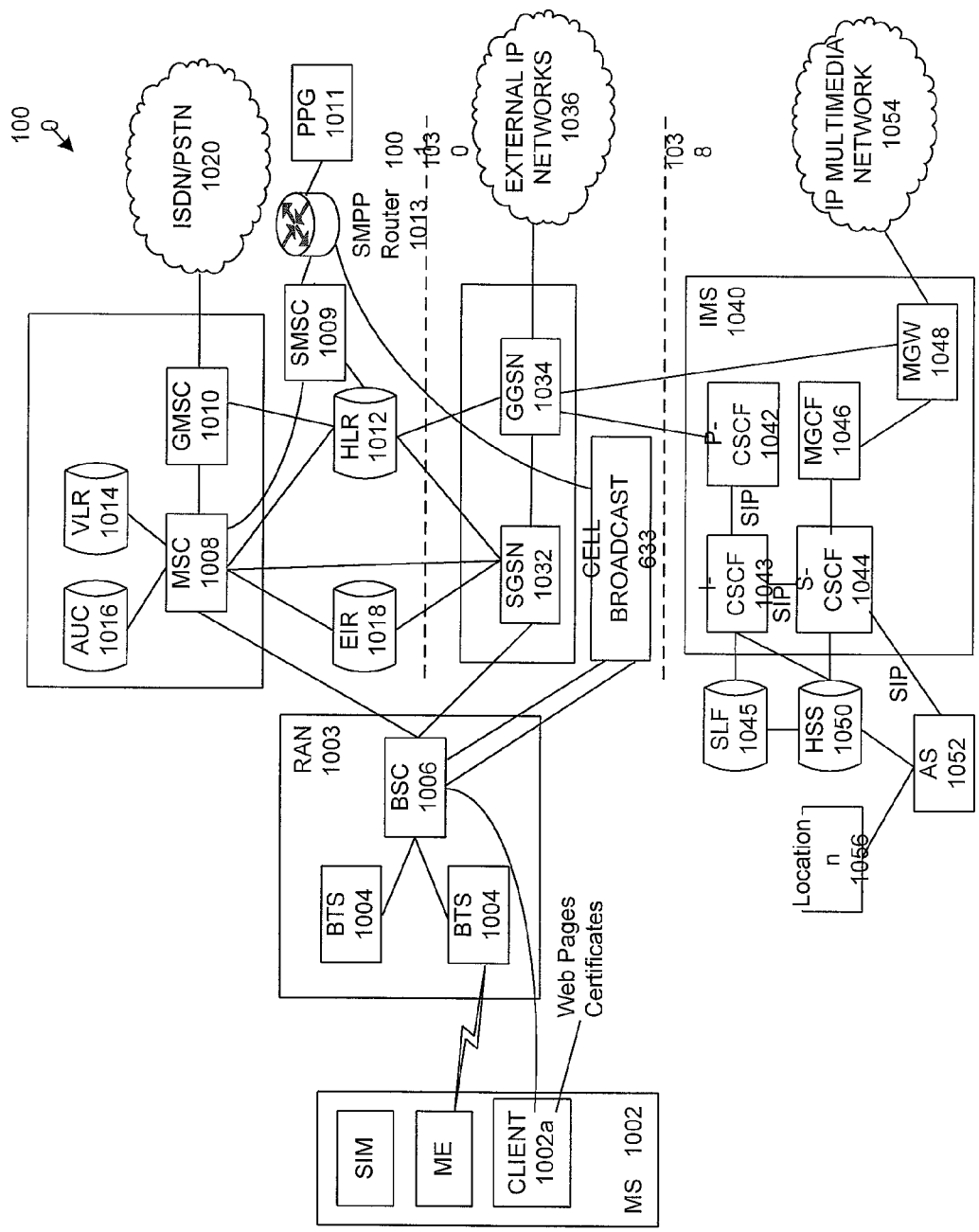
FIG. 10 illustrates an example alternate block diagram of an exemplary GSM/GPRS/IP multimedia network architecture in which selectable broadcast EAS messages may be accomplished.

FIG. 10 illustrates another exemplary block diagram view of a GSM/GPRS/IP multimedia network architecture 1000 in which selectable processing of an EAS message can be incorporated. As illustrated, architecture 1000 of FIG. 10 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments selectively processing a broadcast message have been described in connection with various computing devices, the underlying concepts can be applied to any computing device or system capable of selectively processing a broadcast message. The various techniques described herein can be implemented in connection with hardware or software or, where appropriate, with a combination of both. Thus, the methods and apparatus for selectively processing a broadcast message, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for selectively processing a broadcast message. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for selectively processing a broadcast message also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for selectively processing a broadcast message. When implemented on a general-purpose processor, the program code combines with the processor to provide a unique apparatus that operates to invoke the functionality of selectively processing a broadcast message. Additionally, any storage techniques used in connection with selectively processing a broadcast message can invariably be a combination of hardware and software.

While selectively processing a broadcast message has been described in connection with the various embodiments of the various figures, it is to be understood that other similar embodiments can be used or modifications and additions can be made to the described embodiment for performing the same function of selectively processing a broadcast message without deviating therefrom. For example, one skilled in the art will recognize that various combinations, not specifically depicted herein, of enhanced emergency alert message parameters can be embedded in an enhanced emergency alert message, and that various instructions, not specifically depicted herein, pertaining to the processing of the enhanced emergency alert message in accordance with the parameters therein can be utilized. Further, one skilled in the art will recognize that a system for selectively processing a broadcast message as described may apply to any environment, whether wired or wireless, and may be applied to any number of devices connected via a communications network and interacting across the network. Therefore, selectively processing a broadcast message should not be limited to any single embodiment, but rather should be construed in breadth and scope in accordance with the appended claims.

What is claimed is:

1. A method comprising:
   receiving a broadcast emergency alert message;
   determining if the received broadcast emergency alert message comprises at least one parameter indicative of a characteristic of the emergency alert message in a header of the received broadcast emergency alert message wherein, characteristics of the emergency alert message include an alert type, an alert likelihood, a severity of the alert, a geographic extent of an alert area, and an originator of the alert message;
   when the received broadcast emergency alert message comprises the at least one parameter:
      determining that the at least one parameter indicates the alert likelihood and the severity of the alert;
      determining whether the alert likelihood exceeds a user-defined likelihood threshold and whether the severity of the alert exceeds a severity threshold;
      when the alert likelihood does not exceed the user-defined likelihood threshold or the severity of the alert does not exceed the severity threshold, ignoring the received broadcast emergency alert message; and
      when the alert likelihood exceeds the user-defined threshold likelihood and the severity of the alert exceeds the severity threshold, processing the received broadcast emergency alert message in accordance with predetermined instructions that define how to process the received broadcast emergency alert message based on the at least one parameter and a user-defined time frame in which the broadcast emergency alert message is received;
   if the received broadcast emergency alert message does not comprise the at least one parameter, then bypassing the predetermined instructions and rendering the received broadcast emergency alert message; and
   when the received broadcast emergency alert message is not received within the user-defined time frame, ignoring the received broadcast emergency alert message.

2. A method in accordance with claim 1, wherein the at least one parameter further is indicative of at least one alert subtype.

3. A method in accordance with claim 1, wherein the alert type comprises at least one of geophysical, meteorological, public safety, child abduction, public health, CBRNE (Chemical, Biological, Radiological, Nuclear, Explosive), system test, government issued, general emergency, law enforcement, military, homeland security, local security, private security, rescue and recovery, fire suppression and rescue, medical, pollution, environmental, public transportation, private transportation, utility, telecommunication, and non-transport infrastructure.

4. A method in accordance with claim 3, wherein for an alert type of meteorological, an alert subtype comprises at least one of windstorm, tornado, hurricane, tsunami, lightning storm, thunderstorm, hurricane, freezing rain, blizzard, or fog.

5. A method in accordance with claim 1, wherein the alert comprises at least one of a weather alert, an America's Missing: Broadcast Emergency Response (AMBER) alert, and a government issued alert.

6. A method in accordance with claim 1, further comprising:
  when the received broadcast emergency alert message comprises the at least one parameter, determining if the predetermined instructions define how to process the received broadcast emergency alert message having the at least one parameter;
  when the predetermined instructions define how to process the received broadcast emergency alert message having the at least one parameter, processing the received broadcast emergency alert message in accordance with the predetermined instructions; and
  when the predetermined instructions do not define how to process the received broadcast emergency alert message; rendering at least one of the received broadcast emergency alert message or a notification of the received broadcast emergency alert message.

7. A method in accordance with claim 6, further comprising, when the predetermined instructions define how to process the received broadcast emergency alert message, performing at least one of:
  rendering at least one of the received broadcast emergency alert message and a notification of the enhanced emergency alert message in accordance with the predetermined instructions;
  storing the received broadcast emergency alert message in accordance with the predetermined instructions; or
  ignoring the received broadcast emergency alert message in accordance with the predetermined instructions.

8. A method in accordance with claim 1, further comprising:
  rendering at least one of the received broadcast emergency alert message or a notification of the received broadcast emergency alert message in accordance with at least one of a visual rendering, an audible rendering, and a mechanical rendering.

9. A mobile device comprising:
  a first processor configured to:
    receive a broadcast emergency alert message; and
    determine if the received broadcast emergency alert message comprises at least one parameter indicative of a characteristic of the emergency alert message in a header of the received broadcast emergency alert message wherein, characteristics of the emergency alert message including an alert type, a likelihood of alert occurrence, a severity of the alert, a geographic extent of an alert area, and an originator of the alert message; and
  a second processor configured to:
    when the received broadcast emergency alert message comprises the at least one parameter:
      extract the at least one parameter from the emergency alert message;
      determine that the at least one parameter indicates the alert likelihood and the severity of the alert;
      determine whether the alert likelihood exceeds a user-defined likelihood threshold and whether the severity of the alert exceeds a severity threshold;
      when the alert likelihood does not exceed the user-defined likelihood threshold or the severity of the alert does not exceed the severity threshold, ignore the received broadcast emergency alert message; and
      when the alert likelihood exceeds the user-defined threshold likelihood and the severity of the alert exceeds the severity threshold, process the received broadcast emergency alert message in accordance with predetermined instructions that define how to process the received broadcast emergency alert message based on the at least one parameter and a user-defined time frame in which the broadcast emergency alert message is received;
    if the received broadcast emergency alert message does not comprise the at least one parameter, then bypass the predetermined instructions and render the received broadcast emergency alert message; and
    when the received broadcast emergency alert message is not received within the user-defined time frame, ignore the received broadcast emergency alert message.

10. A mobile device in accordance with claim 9, wherein the at least one parameter further is indicative of at least one alert subtype.

11. A mobile device in accordance with claim 9, wherein the alert type comprises at least one of geophysical, meteorological, public safety, child abduction, public health, CBRNE (Chemical, Biological, Radiological, Nuclear, Explosive), system test, government issued, general emergency, law enforcement, military, homeland security, local security, private security, rescue and recovery, fire suppression and rescue, medical, pollution, environmental, public transportation, private transportation, utility, telecommunication, and non-transport infrastructure.

12. A mobile device in accordance with claim 11, wherein for an alert type of meteorological, an alert subtype comprises at least one of windstorm, tornado, hurricane, tsunami, lightning storm, thunderstorm, hurricane, freezing rain, blizzard, or fog.

13. A mobile device in accordance with claim 9, wherein the alert comprises at least one of a weather alert, an America's Missing: Broadcast Emergency Response (AMBER) alert, and a government issued alert.

14. A mobile device in accordance with claim 9:
  the second processor further configured to:
    if the received broadcast emergency alert message comprises the at least one parameter, determine if the predetermined instructions define how to process the received broadcast emergency alert message having the at least one parameter; and
    if the predetermined instructions define how to process the received broadcast emergency alert message having the at least one parameter, process the received broadcast emergency alert message in accordance with the predetermined instructions; and
  the mobile device further comprising an interface configured to:
    when the predetermined instructions do not define how to process the received broadcast emergency alert message, facilitate rendering of at least one of the received broadcast emergency alert message or a notification of the emergency alert message.

15. A mobile device in accordance with claim 14, wherein, when the predetermined instructions define how to process the received broadcast emergency alert message having the at least one parameter, the mobile device processes the received broadcast emergency alert message in accordance with one of:

rendering at least one of the emergency alert message and a notification of the emergency alert message in accordance with the predetermined instructions;

storing the emergency alert message in accordance with the predetermined instructions; or ignoring the emergency alert message in accordance with the predetermined instructions.

16. A mobile device in accordance with claim 9, wherein:

at least one of the received broadcast emergency alert message and a notification of the emergency alert message is at least one of visually rendered, audibly rendered, or mechanically rendered.

\* \* \* \* \*